United States Patent

Uchiyama et al.

[11] Patent Number: 5,500,762
[45] Date of Patent: Mar. 19, 1996

[54] LIGHT FREQUENCY CONTROL APPARATUS

[75] Inventors: Haruyoshi Uchiyama; Tekken Lee; Nobunari Takeuchi, all of Tokyo; Kaoru Shimizu; Tsuneo Horiguchi, both of Mito; Yahei Koyamada, Tokyo, all of Japan

[73] Assignees: Ando Electric Co., Ltd.; Nippon Telegraph and Telephone Corporation, both of Tokyo, Japan

[21] Appl. No.: 364,327

[22] Filed: Dec. 27, 1994

[30] Foreign Application Priority Data

Dec. 28, 1993 [JP] Japan .................................... 5-338668

[51] Int. Cl.⁶ ................................................. H01S 3/10
[52] U.S. Cl. ........................ 359/326; 359/348; 372/25; 372/32; 385/15
[58] Field of Search ......................... 372/9, 25, 29, 372/30, 32, 108; 385/15, 24, 31, 39, 42; 359/326, 332, 341, 347, 348

[56] References Cited

U.S. PATENT DOCUMENTS

| | | | |
|---|---|---|---|
| 4,136,929 | 1/1979 | Suzaki | 372/108 X |
| 4,410,992 | 10/1983 | Javan | 372/32 |
| 4,815,085 | 3/1989 | Javan | 372/32 |
| 4,817,099 | 3/1989 | Javan | 372/32 |
| 4,841,529 | 6/1989 | Javan | 372/32 |
| 4,896,119 | 1/1990 | Williamson et al. | 359/348 |
| 4,923,266 | 5/1990 | Bovet et al. | 385/42 |
| 5,233,619 | 8/1993 | Furuhashi et al. | 372/25 X |
| 5,309,455 | 5/1994 | Adachi et al. | 372/25 |

*Primary Examiner*—John D. Lee
*Attorney, Agent, or Firm*—Finnegan, Henderson, Farabow, Garrett & Dunner

[57] ABSTRACT

The present invention provides light frequency control apparatus comprising a light pulse signal generating mechanism for converting continuous light into a light pulse signal, and outputting this light pulse signal; a light signal generating mechanism for repeatedly generating at predetermined cycles, a light signal, in which a light frequency component therein is shifted to form a staircase shape based on the number of cycles of a loop within which the light pulse signal circulates; and a dummy light generating mechanism for generating dummy light at a timing such that the level of the light signal becomes zero, and supplying this dummy light to the light amplifying mechanism. The aforementioned loop is formed from a light amplifying mechanism for amplifying the light pulse signal outputted from the light pulse signal generating mechanism, light delay mechanism for delaying the light pulse signal a fixed amount; and frequency shifting mechanism for shifting the frequency of the light pulse signal.

1 Claim, 4 Drawing Sheets

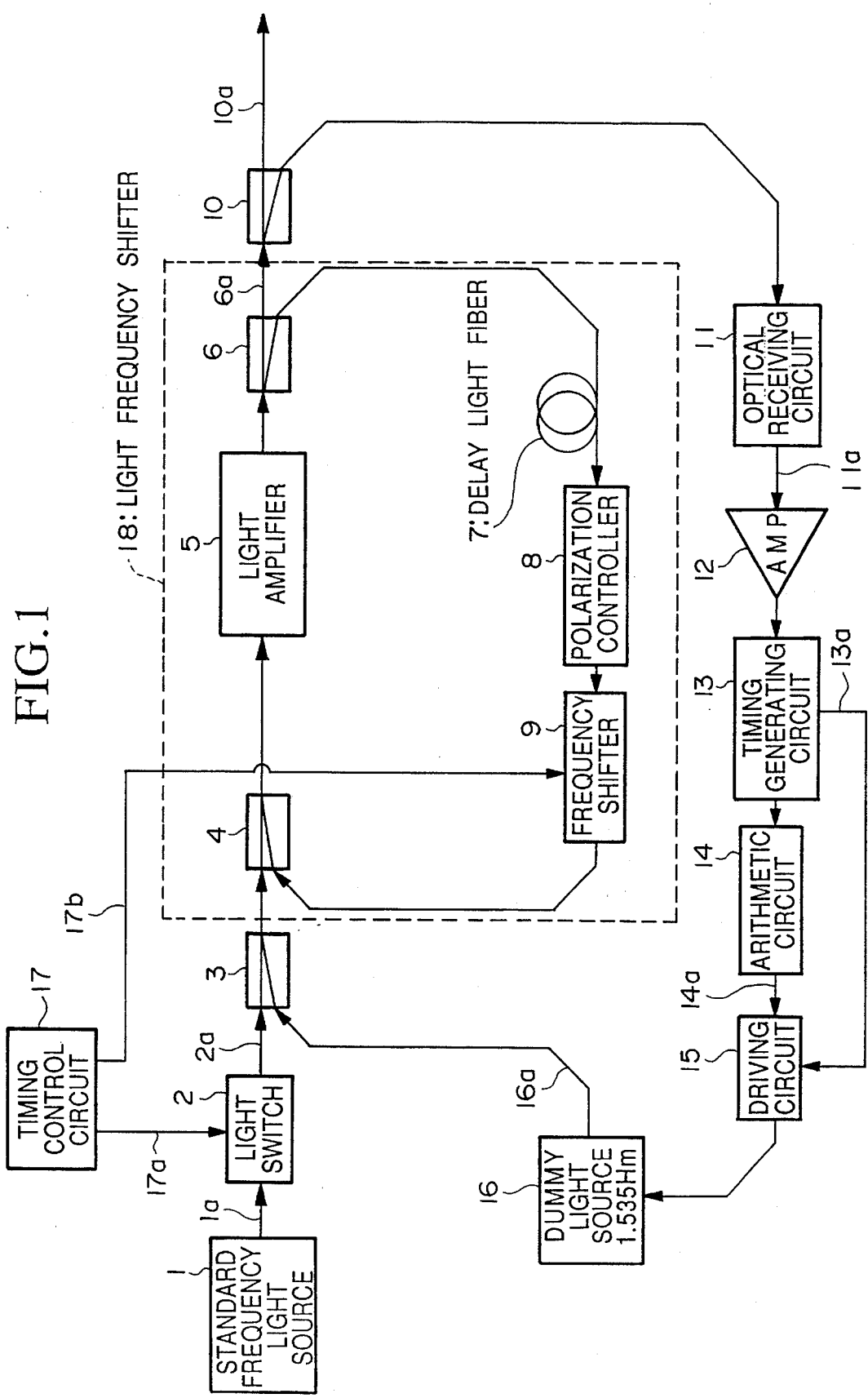

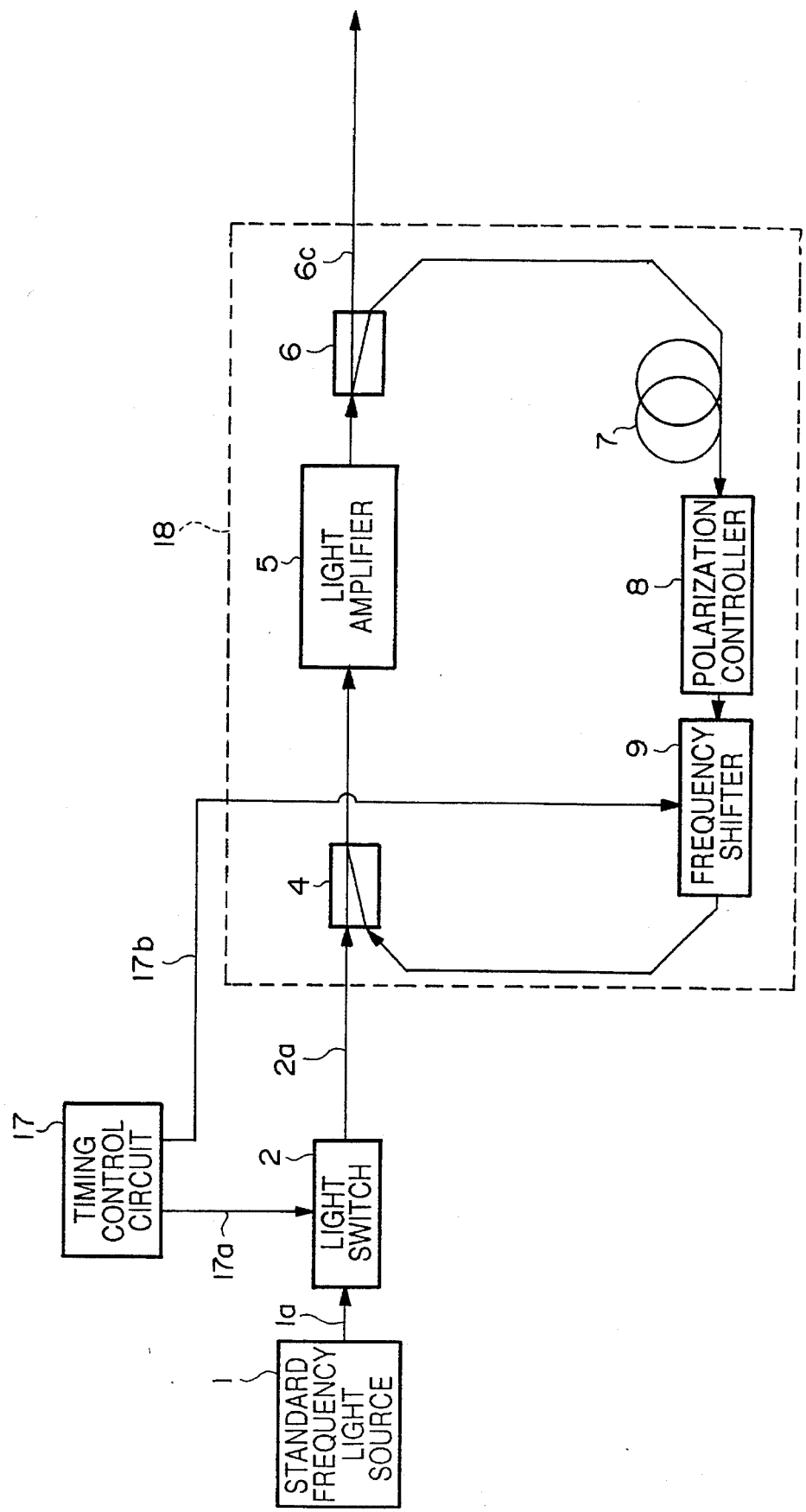

LIGHT FREQUENCY CONTROL APPARATUS

BACKGROUND OF THE INVENTION

Field of the Invention

The present invention relates to a light frequency control apparatus which is ideal for use, for example, in a frequency multiplex transmission system.

Relevant Art

In recent years, light frequency control devices for generating CW (continuous) light of a predetermined light frequency have been widely developed. A structural example of this type of device is shown in FIG. 4. As shown in this figure, a standard frequency light source 1 for outputting CW light 1a possessing a light frequency fixed at a predetermined value; light switch 2 for converting CW light 1a supplied from standard frequency light source 1 into a light pulse signal 2a; light frequency shifter 18 for shifting and outputting a light pulse signal 2a supplied from light switch 2; and timing control circuit 17 for respectively supplying a timing signal 17a to light switch 2, and a timing signal 17b to light frequency shifter 18, are provided.

In light frequency shifter 18, a light coupler 4 for coupling and outputting light pulse signal 2a inputted via light switch 2 and a feedback signal supplied from frequency shifter 9 (to be explained hereafter); light amplifier 5 formed from EDFA (erbium addition optical fiber amplifier) for amplifying a light pulse signal supplied from light coupler 4; light coupler 6 for outputting a light pulse signal outputted from light amplifier 5 as light signal 6c, and for supplying a portion of this light pulse signal to delay optical fiber 7; delay optical fiber 7 for delaying a light pulse signal for a fixed delay period; polarization controller 8 for controlling the depolarization state of the light pulse signal supplied from delay optical fiber 7; and frequency shifter 9 for shifting the frequency of a light pulse signal, and supplying this resultant signal to light coupler 4 as a feedback light signal, are respectively provided.

According to this structure, light pulse signal 2a introduced from light coupler 4 circulates in a loop formed by means of light amplifier 5, light coupler 6, delay optical fiber 7, polarization controller 8, and frequency shifter 9 in light frequency shifter 18. Every time light pulse signal 2a circulates this loop, the frequency therein is shifted a fixed amount by means of frequency shifter 9, and delayed for a fixed delay period by means of delay optical fiber 7. As a result, a light signal 6c, in which the frequency component therein is shifted to form a staircase shape on the time axis, is outputted from light frequency shifter 18.

However, according to the conventional light frequency control device, in light frequency shifter 18, when the light pulse signal is amplified by means of light amplifier 5, even after the light pulse signal becomes zero (i.e., non-signal state), due to the properties of light amplifier 5, energy accumulates in the erbium dope optical fiber. Subsequently, when the next light pulse signal is supplied, the aforementioned accumulated energy is added thereto, which in turn, changes the peak characteristics of the pulse waveform to be outputted. In this manner, as shown in FIG. 5, the amplification of the peak portions becomes large and results in the output of a waveform in which the peaks are sharply distorted. In addition, the number of cycles of the light pulse signal in light frequency shifter 18, as well as the number of passages through light amplifier 5 both increase, resulting in an increase in the distortion of the above waveform. As a result, the deterioration of the S/N ratio of the light pulse signal increases, and the number of cycles therein must accordingly be reduced.

SUMMARY OF THE INVENTION

In consideration of the aforementioned problems, it is an object of the present invention to provide a light frequency control apparatus which can increase the number of loop cycles of a light pulse signal within the light frequency shifter by means of improving the stability of the output signal and shaping the output signal of the light frequency shifter; and also conduct both frequency shift over a wide range, as well as conversion of a stable light frequency.

In order to achieve this object, the present invention provides a light frequency control apparatus comprising:

light pulse signal generating means for converting continuous light into a light pulse signal, and outputting said light pulse signal;

light signal generating means for repeatedly generating at predetermined cycles, a light signal, in which a light frequency component therein is shifted to form a staircase shape based on the number of cycles of a loop within which said light pulse signal circulates; said loop formed from a light amplifying means for amplifying said light pulse signal outputted from said light pulse signal generating means; light delay means for delaying said light pulse signal a fixed amount; and frequency shifting means for shifting the frequency of said light pulse signal; and dummy light generating means for generating dummy light at a timing such that the level of said light signal becomes zero, and supplying said dummy light to said light amplifying means.

According to the structure of the present invention, a light pulse signal outputted from a light pulse generating means is supplied to a light signal generating means and repeatedly outputted at predetermined cycles as a light signal in which the light frequency component is shifted to form a staircase shape, based on the number of cycles which the light pulse signal circulates in a loop formed from a light amplifying means, light delay means, and frequency shifting means. In addition, a dummy light generating means generates a dummy light at a timing such that the level of the aforementioned light signal becomes zero, and supplies this dummy light to the light amplifying means of the light signal generating means. As a result, the non-signal state of the light pulse signal supplied to the light amplifying means is eliminated, and the generation of distortion in the waveform to be outputted can be controlled.

BRIEF DESCRIPTION OF THE DRAWINGS

FIG. 1 is a block diagram showing a construction of a light frequency control apparatus according to an embodiment of the present invention.

FIG. 2 (b) is a diagram showing a waveform of a light pulse sequence according to the same embodiment.

FIG. 3 (b) is a diagram showing the timing of a timing signal 17b according to an embodiment of the present invention.

FIG. 4 is a block diagram showing an example of conventional light frequency control device.

DETAILED DESCRIPTION OF THE PREFERRED EMBODIMENTS

Figure 2A:
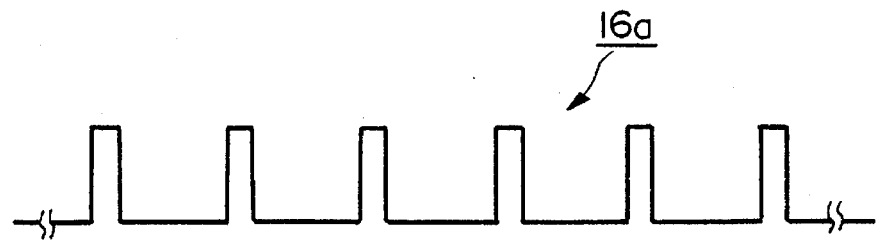
FIG. 2 (a) is a diagram showing a waveform of a dummy light.

In the following, the embodiments of the present invention will be explained with reference to the figures.

FIG. 1 is a block diagram showing the entire structure of an embodiment of the present invention. In this figure, portions corresponding to those shown in FIG. 4 will be denoted by the same numbers, and their explanations will be omitted. In this figure, as standard frequency light source 1, a semiconductor laser diode, such as a DFB-LD with a 1.55 μm band which is equipped with ATC (automatic temperature control) and AFC (automatic frequency control), is employed. In the aforementioned AFC, the wavelength of the laser is fixed at 1551.177 nm by means of the acetylene absorption cell. In addition, as light switch 2, 2–3 ports of AOM (acoustic optical modulator) are used.

In addition, a 5 nm band-pass filter is installed in light amplifier 5; dummy light 16a (to be mentioned hereafter) is cut off by means of this band-pass filter. Furthermore, 2–3 AOM's are employed as frequency shifter 9. The control frequency of this frequency shifter 9 is set to 120 MHz. As a result, when a light pulse signal passes through frequency shifter 9, the light frequency therein is shifted to 120 MHz. Light frequency shifter 18 repeatedly generates light signal 6a, i.e., a light pulse sequence, in which the light frequency is shifted to form a staircase shape at predetermined cycles T.

Furthermore, a light coupler 10 is provided for outputting a light signal 6a outputted from light frequency shifter 18 as light signal 10a, and supplying a portion therein, i.e., a light pulse signal to optical receiving circuit 11. A photodiode (PD) is employed as this optical receiving circuit 11. Optical receiving circuit 11 outputs the light pulse signal supplied from light coupler 10 as waveform signal 11a (electronic signal).

Additionally, an amplifier 12 for amplifying waveform signal 11a supplied from optical receiving circuit 11; timing generating circuit 13 for detecting the timing which will cause the level of the light pulse signal to become zero based on the waveform signal 11a supplied from amplifier 12, and outputting a timing signal 13a; arithmetic circuit 14 for detecting the level of the light pulse signal based on the aforementioned waveform signal 11a, computing the level of dummy light 16a (to be mentioned hereafter) based on this level, and outputting this as level signal 14a; and driving circuit 15 for supplying a driving signal to dummy light source 16 based on the aforementioned timing signal 13a and level signal 14a, are respectively provided.

Dummy light source 16 generates a dummy light 16a based on the driving signal supplied from driving circuit 15, and supplies this signal to light coupler 3. As dummy light source 16, a laser of a different wavelength (1535 nm) than that of standard frequency light source 1 (1551.177 nm) is employed. Consequently, the aforementioned dummy light 16a is generated at a timing in response to the above-described timing signal 13a to form a pulse waveform at a level based on level signal 14a. This dummy light 16a is supplied from light coupler 3 to light frequency shifter 18.

Figure 2B:
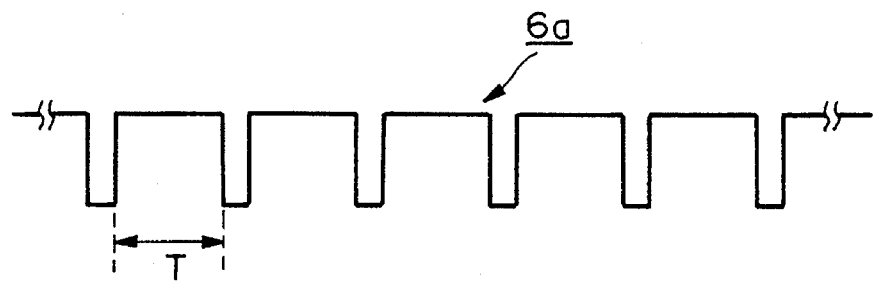
Figure 3A:
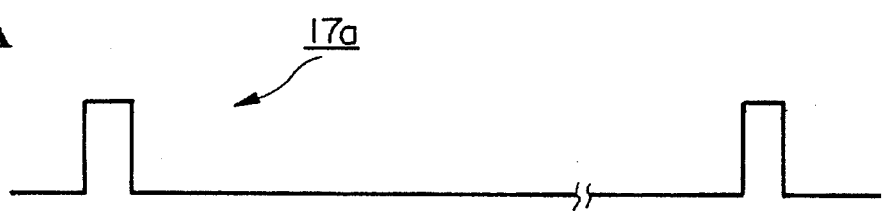
FIG. 3 (a) is diagram showing the timing of a timing signal 17a according to a conventional light frequency control device.
Figure 3B:
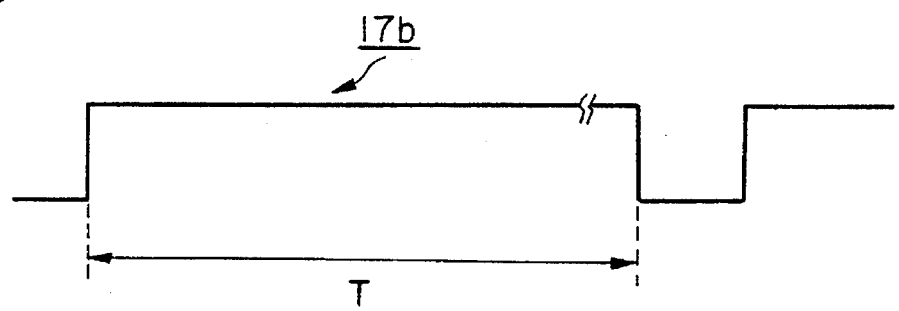

In the following, a light frequency control apparatus according to the aforementioned construction will be explained with reference to FIGS. 1, 2 and 3. FIG. 2 (a) is a diagram showing the timing of a dummy light, and FIG. 2 (b) is a diagram showing the timing of a light pulse sequence. In addition, FIG. 3 (a) is diagram showing timing signal 17a supplied from timing control circuit 17 to light switch 2; and FIG. 3 (b) is a diagram showing timing signal 17b supplied to frequency shifter 9.

In addition, when timing signal 17a is supplied, light switch 2 switches CW light 1a supplied from standard frequency light source 1, and outputs the aforementioned as light pulse signal 2a. This light pulse signal 2a is supplied to light frequency shifter 18, and circulates in the loop formed from light coupler 4, light amplifier 5, light coupler 6, delay optical fiber 7, polarization controller 8 and frequency shifter 9. At every cycle of the loop, light pulse signal 2a undergoes a frequency shift based on cycle T of timing signal 17b, shown in FIG. 3 (b), by means of frequency shifter 9, which results in the supply of a feedback light signal to light coupler 4. In addition, a light pulse sequence 6a is outputted from light coupler 6 and supplied to light coupler 10.

At this time, the light pulse signal which represents a portion of light pulse sequence 6a outputted from the above-described light frequency shifter 18 is supplied to optical receiving circuit 11 via light coupler 10. This light pulse signal is then converted into a waveform signal 11a by means of optical receiving circuit 11. Waveform signal 11a is subsequently amplified by means of amplifier 12, and supplied to timing generating circuit 13. Based on this aforementioned waveform signal 11a, the timing which will cause the level of the light pulse signal to become zero is detected by means of timing generating circuit 13 and outputted as timing signal 13a. In addition, based on waveform signal 11a, the level of dummy light 16a to be generated is determined by means of arithmetic circuit 14 and outputted as level signal 14a.

Figure 5:
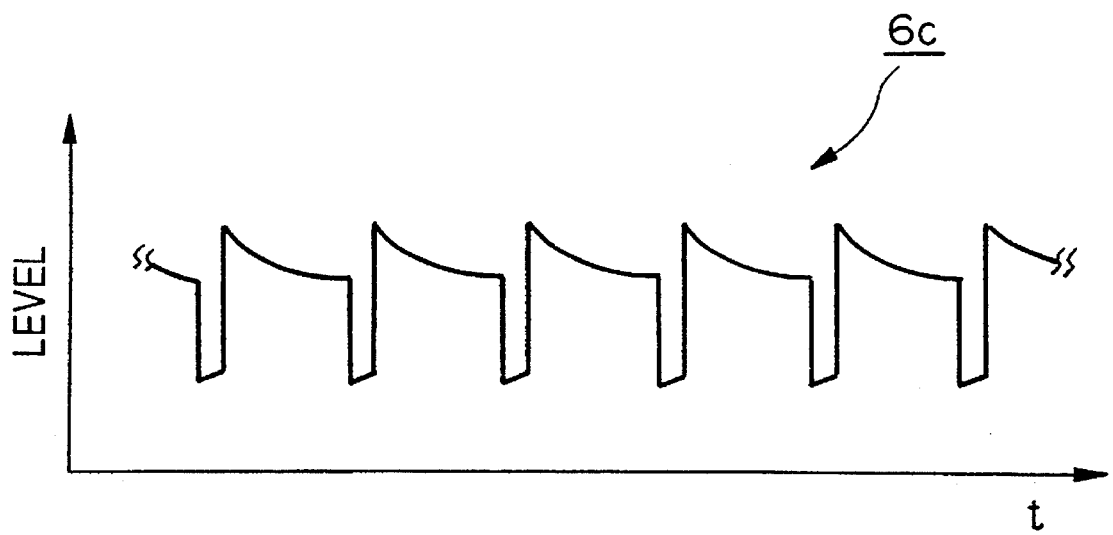
FIG. 5 is a diagram showing a waveform of a light signal 6c according to a conventional light frequency control device.

Subsequently, the aforementioned timing signal 13a and level signal 14a are supplied to driving circuit 15, and driving signal of dummy light source 16 is then outputted based on these signals. As a result, as shown in FIGS. 2 (a) and (b), dummy light 16a is generated from dummy light source 16 during the interval when the level of the light pulse signal is zero, and supplied to light coupler 3. Subsequently, dummy light 16a is supplied from light coupler 3 to light coupler 4, and then supplied to light amplifier 5 along with the feedback signal outputted from frequency shifter 9. In other words, during the interval when the level of the light pulse signal is zero, this dummy light 16a generates a pulse at a level corresponding to the level of the light pulse signal. In this manner, by means of adding this aforementioned pulse of dummy light 16a after the pulse of the light pulse signal, the energy accumulated in the erbium dope optical fiber within light amplifier 5 from the previous pulse can be emitted. In this manner, the non-signal state of the light pulse signal introduced into light amplifier 5 is eliminated, and the generation of distortion of the waveform shown in FIG. 5 can be controlled.

Since the wavelength of dummy light 16a differs from the wavelength of standard frequency light source 1, dummy light 16a is cut off by means of the band-pass filter provided in light amplifier 5 such that this dummy light 16a does not leave (i.e., is not outputted from) light amplifier 5. Hence, only light pulse signals with wavelengths close to that of standard frequency light source 1 are outputted from light amplifier 5. Subsequently, at every cycle T, the aforementioned operations are conducted in a similar manner. As a result, the light pulse signal 6a outputted from light coupler 6 forms a waveform which is free of distortion as shown in FIG. 2 (b).

Results of the Invention

According to the present invention, the non-signal state of the light pulse signal introduced into light amplifying mechanism is eliminated, and the generation Of distortion of the waveform can be controlled at the time of shifting the light frequency component of the light pulse signal at regular time intervals by means of providing a light pulse signal generating mechanism for converting continuous light into a light pulse signal, and then outputting this light pulse signal; a light signal generating mechanism for repeatedly generating at predetermined cycles, a light signal, in which a light frequency component therein is shifted to form a staircase shape based on the number of cycles of a loop, formed from a light amplifying mechanism for amplifying the light pulse signal outputted from the light pulse signal generating mechanism, a light delay mechanism for delaying the light pulse signal a fixed amount, and a frequency shifting mechanism for shifting the frequency of the light pulse signal, within which the light pulse signal circulates; and a dummy light generating mechanism for generating dummy light at a timing such that the level of the light signal becomes zero, and supplying this dummy light to the light amplifying mechanism. Consequently, it is possible to improve the stability of the light signal outputted from the light generating mechanism, increase the number of cycles in the light signal generating mechanism, conduct frequency shift over a wide range, and perform conversion of a stable light frequency.

What is claimed is:

1. A light frequency control apparatus comprising:

light pulse signal generating means for converting continuous light into a light pulse signal, and outputting said light pulse signal;

light signal generating means for repeatedly generating at predetermined cycles, a light signal, in which a light frequency. component therein is shifted to form a staircase shape based on the number of cycles of a loop within which said light pulse signal circulates; said loop formed from a light amplifying means for amplifying said light pulse signal outputted from said light pulse signal generating means; light delay means for delaying said light pulse signal a fixed amount; and frequency shifting means for shifting the frequency of said light pulse signal; and dummy light generating means for generating dummy light at a timing such that the level of said light signal becomes zero, and supplying said dummy light to said light amplifying means.

* * * * *